(12) United States Patent
Dasa (10) Patent No.: US 12,554,791 B2
(45) Date of Patent: Feb. 17, 2026

(54) LOADING CONTENT USING CONFIGURATION-BASED TEMPLATES

(71) Applicant: Capital One Services, LLC, McLean, VA (US)

(72) Inventor: Venkata Sudharsan Dasa, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 166 days.

(21) Appl. No.: 18/599,621

(22) Filed: Mar. 8, 2024

(65) Prior Publication Data

US 2025/0284757 A1 Sep. 11, 2025

(51) Int. Cl.
*G06F 16/957* (2019.01)
*G06F 40/174* (2020.01)
*G06F 40/186* (2020.01)

(52) U.S. Cl.
CPC ........ *G06F 16/9577* (2019.01); *G06F 40/174* (2020.01); *G06F 40/186* (2020.01)

(58) Field of Classification Search
CPC .. G06F 16/9577; G06F 40/174; G06F 40/186; G06F 40/143
See application file for complete search history.

(56) References Cited

U.S. PATENT DOCUMENTS

| | | | |
|---|---|---|---|
| 8,140,362 B2 * | 3/2012 | Deshpande | G06Q 10/10 705/7.11 |
| 9,524,283 B2 | 12/2016 | Folsom et al. | |
| 9,699,142 B1 * | 7/2017 | Allen | G06F 21/56 |
| 10,678,995 B2 * | 6/2020 | Sisson | G06F 16/972 |
| 10,776,743 B2 * | 9/2020 | Garrard | G06F 40/186 |
| 11,321,519 B1 * | 5/2022 | Phan | G06F 40/226 |
| 11,354,495 B2 * | 6/2022 | Hegde | G06F 40/186 |
| 11,379,620 B2 * | 7/2022 | Stark | H04L 9/0894 |
| 11,972,201 B2 * | 4/2024 | Gupta | G06F 16/258 |
| 12,299,381 B1 * | 5/2025 | Pezeshki | G06F 40/151 |
| 12,361,206 B1 * | 7/2025 | Jain | H04L 67/06 |
| 2005/0210263 A1 * | 9/2005 | Levas | H04L 9/3263 713/182 |
| 2007/0094199 A1 * | 4/2007 | Deshpande | G06N 5/025 706/47 |
| 2016/0140101 A1 * | 5/2016 | Gosner, Jr. | G06F 40/174 715/225 |
| 2018/0046602 A1 * | 2/2018 | Sisson | G06F 16/972 |
| 2020/0110795 A1 * | 4/2020 | Gupta | G06F 16/258 |
| 2024/0394171 A1 * | 11/2024 | Duan | G06F 11/3608 |

\* cited by examiner

*Primary Examiner* — Kenny Nguyen
(74) *Attorney, Agent, or Firm* — Harrity & Harrity, LLP (57) ABSTRACT

In some implementations, a device may receive, from a user device associated with an entity, a request identifying a content unit that is to be loaded into an electronic document. The device may transmit, via a first service, a configuration request for configuration data for the content unit. The device may receive, via the first service, the configuration data. The device may transmit, via a second service, a data request for entity-specific data for the content unit. The device may receive, via the second service, the entity-specific data. The device may transmit, for the user device, a response indicating presentation data to cause insertion of the content unit, in accordance with the presentation data, into a document object model of the electronic document, where the presentation data is based on the configuration data and the entity-specific data.

20 Claims, 9 Drawing Sheets

FIG. 4 ern the web page in a browser application of the client device. A user of the client device may navigate from the web page to another web page based on links provided in the web page.

LOADING CONTENT USING CONFIGURATION-BASED TEMPLATES

BACKGROUND

A web browser of a client device may request a web page from a content server, and the content server may provide hypertext markup language (HTML) that renders the web page in a browser application of the client device. A user of the client device may navigate from the web page to another web page based on links provided in the web page.

SUMMARY

Some implementations described herein relate to a system for loading content using configuration-based templates. The system may include one or more memories and one or more processors communicatively coupled to the one or more memories. The one or more processors may be configured to receive, from a user device associated with an entity, a request identifying a content unit that is to be loaded into a web page. The one or more processors may be configured to transmit, in response to the request and via a first service, a configuration request for configuration data for the content unit. The one or more processors may be configured to receive, via the first service, the configuration data, where the configuration data indicates a set of display parameters relating to one or more form fields of an electronic form, a set of validation parameters relating to the one or more form fields, and a mapping between the one or more form fields and a set of variables. The one or more processors may be configured to transmit, in response to the request and via a second service, a data request for entity-specific data for the content unit. The one or more processors may be configured to receive, via the second service, the entity-specific data, where the entity-specific data indicates values for the set of variables. The one or more processors may be configured to generate presentation data, for the content unit, using the configuration data, the entity-specific data, and a presentation template for the content unit. The one or more processors may be configured to transmit, for the user device, a response indicating the presentation data to cause insertion of the presentation data into a document object model of the web page.

Some implementations described herein relate to a method of loading content using configuration-based templates. The method may include receiving, by a device and from a user device associated with an entity, a request identifying a content unit that is to be loaded into an electronic document. The method may include transmitting, by the device in response to the request and via a first service, a configuration request for configuration data for the content unit. The method may include receiving, by the device and via the first service, the configuration data, where the configuration data indicates a set of display parameters relating to one or more form fields of an electronic form and a mapping between the one or more form fields and a set of variables. The method may include transmitting, by the device in response to the request and via a second service, a data request for entity-specific data for the content unit. The method may include receiving, by the device and via the second service, the entity-specific data, where the entity-specific data indicates values for the set of variables. The method may include transmitting, by the device and for the user device, a response indicating presentation data to cause insertion of the content unit, in accordance with the presentation data, into a document object model of the electronic document, where the presentation data is based on the configuration data and the entity-specific data.

Some implementations described herein relate to a non-transitory computer-readable medium that stores a set of instructions for loading content using configuration-based templates. The set of instructions, when executed by one or more processors of a device, may cause the device to receive, from a user device associated with an entity, a request identifying a content unit. The set of instructions, when executed by one or more processors of the device, may cause the device to transmit, in response to the request, a configuration request for configuration data for the content unit. The set of instructions, when executed by one or more processors of the device, may cause the device to receive the configuration data, where the configuration data indicates a set of display parameters relating to one or more form fields of an electronic form and a mapping between the one or more form fields and a set of variables. The set of instructions, when executed by one or more processors of the device, may cause the device to transmit, in response to the request, a data request for entity-specific data for the content unit. The set of instructions, when executed by one or more processors of the device, may cause the device to receive the entity-specific data, where the entity-specific data indicates values for the set of variables. The set of instructions, when executed by one or more processors of the device, may cause the device to transmit, for the user device, a response indicating presentation data, for the content unit, that is based on the configuration data, the entity-specific data, and a presentation template.

DETAILED DESCRIPTION

The following detailed description of example implementations refers to the accompanying drawings. The same reference numbers in different drawings may identify the same or similar elements.

A web page may have an appearance and content that is configured in hypertext markup language (HTML) markup for the web page. A website may include multiple similar web pages that are each configured by similar, redundant HTML markup. Moreover, the web pages may be static, meaning that the user interface elements and/or content of the web pages are fixed. Storing numerous, static web pages that are similar, except for minor variations, may consume excessive computing resources (e.g., memory resources and/or processor resources). In addition, adding or updating static web pages to the website may involve iterative development and deployment steps that are inefficient and use significant computing resources.

Some implementations described herein provide configuration-based templates that enable the loading of dynamic content into an electronic document, such as a web page. In some implementations, rather than employing multiple static electronic documents that have similar content and layouts (e.g., similarly-configured electronic forms), the content of the electronic documents can be represented as respective configurations and the layout of the electronic documents can be defined in a single shared template. Moreover, a configuration may indicate both user-independent data (e.g., parameters defining form fields of an electronic form) and user-specific data (e.g., values for prefilling the form fields), which may be maintained by respective microservices to improve data integrity, data security, and retrieval efficiency of the data.

The user-independent data and the user-specific data may be aggregated with the template to generate a content unit that can be inserted into the document object model (DOM) of a top-level electronic document. The top-level electronic document may be lightweight, in order to consume minimal computing resources. By using configurations and a shared template to represent multiple content units, the information for the multiple content units can be stored more efficiently and using fewer computing resources than would otherwise be used by storing the same information as multiple static electronic documents. Furthermore, the creation of new content units is streamlined and less error-prone, enabling the addition of content units using minimal development and deployment cycles. Moreover, the user-independent data of a configuration may include form validation parameters that can be used to generate form validation code of the content unit, thereby enabling client-side form validation for dynamic content. The client-side form validation uses less communication between a user device and a remote server than server-side form validation, thereby conserving network resources and computing resources.

FIGS. 1A-1F are diagrams of an example 100 associated with loading content using configuration-based templates. As shown in FIGS. 1A-1F, example 100 includes a management system, a user device, and one or more service devices. These devices are described in more detail in connection with FIGS. 2 and 3.

The management system may be associated with an organization, such as a financial institution. The management system may provide content for an electronic document, such as a web page or a website, that is configured to allow a plurality of entities to view and/or edit entity-specific settings (e.g., via one or more electronic forms). For example, the web page or website may be a backend where the entities can manage settings for their respective online stores. The plurality of entities may use and/or promote services of the organization. For example, the plurality of entities may be car dealerships, and the organization may provide financing to customers of the car dealerships to facilitate transactions between the customers and the car dealerships. In some implementations, the management system may implement a backend for frontend (BFF) for the electronic document. The user device may be associated with one of the entities. The user device may implement a user interface, such as a web browser, that facilitates presentation of the electronic document on the user device. The service devices may implement one or more services (e.g., microservices, data services, or the like) that store data used in connection with the electronic document. In some implementations, the service devices may be a component of the management system.

Figure 1A:
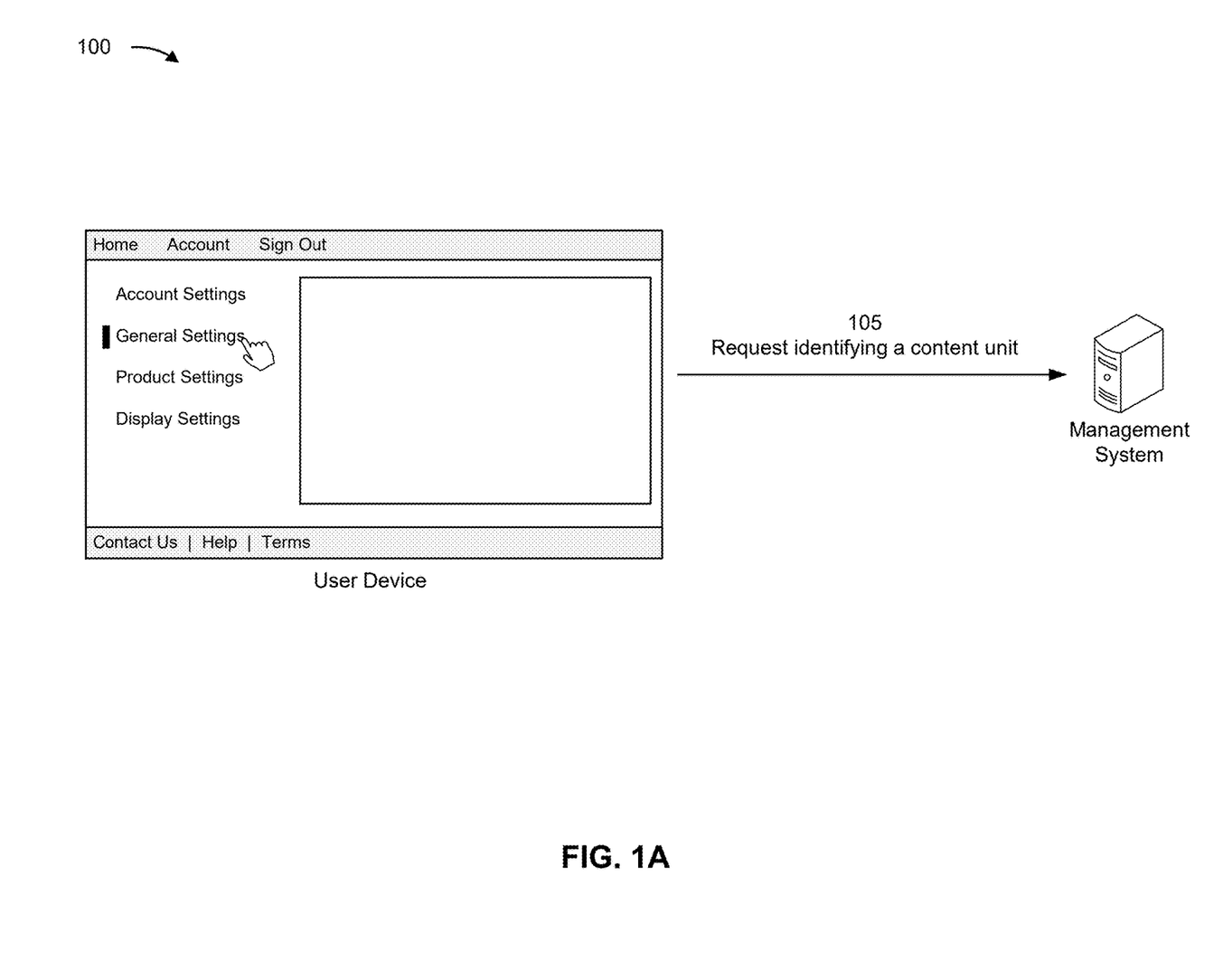
FIGS. 1A-1F are diagrams of an example associated with loading content using configuration-based templates, in accordance with some embodiments of the present disclosure.

As shown in FIG. 1A, and by reference number 105, the user device may transmit, and the management system may receive, a request identifying a content unit (e.g., of a plurality of content units) that is to be loaded in the electronic document. The electronic document may be a top-level electronic document that is configured as a container to load any one of a plurality of content units (e.g., where each content unit has separate content that is representative of a separate electronic document or web page). The content unit may be for loading into a DOM of the electronic document, such as a DOM of a web page. The electronic document (e.g., the web page) may include code, such as JavaScript code. The code may be configured to manipulate the DOM to update parts of the electronic document dynamically.

The electronic document may include a navigation menu that includes a plurality of links (e.g., with accompanying text) to different content units of the electronic document. Each content unit may be associated with respective content. In some implementations, the request may be caused when a user of the user device interacts with (e.g., clicks on or otherwise selects) one of the links that is for a particular content unit. In some implementations, the link may identify (e.g., in a query string of the link) the content unit that is to be loaded in the electronic document. For example, the link may identify the content unit (e.g., using a name of the content unit or an alphanumeric identifier for the content unit) and/or may identify a template for the content unit (e.g., using a name of the template or an alphanumeric identifier for the template), or the like. Accordingly, in a similar manner, the request may identify the content unit using a content unit indicator (e.g., a content unit identifier and/or a template identifier).

The request may be a hypertext transfer protocol (HTTP) request. In some implementations, the request is an asynchronous request caused by execution of the code in the electronic document. For example, the user interaction with the link may cause execution of the code (e.g., execution of a function of the code) that initiates the request. In some implementations, the management system may receive the request from the user device via an intermediary device. For example, the request may be received at a web server executing an application, and the application may process the request and cause the web server to forward the request, in its original form or in a modified form, to the management system.

In response to receiving the request, the management system may perform actions to aggregate, from several sources, data that is used for the content unit. For example, the content unit may include an aggregation of configuration data and entity-specific data into a presentation template, as described herein.

Figure 1B:
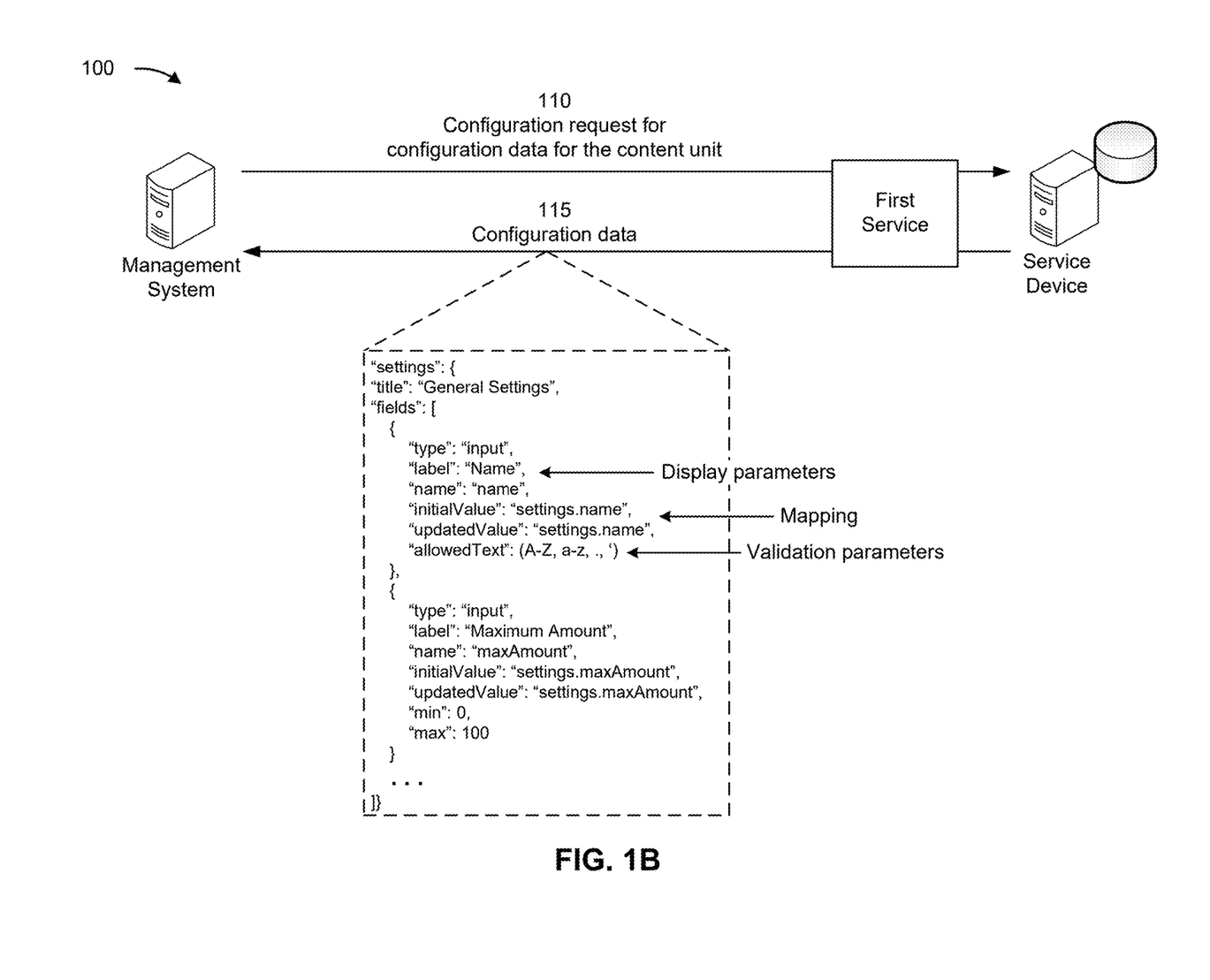

As shown in FIG. 1B, and by reference number 110, in response to the request, the management system may transmit, via a first service (e.g., a first microservice, a first data service, or the like), a configuration request for the configuration data for the content unit. For example, the management system may transmit the configuration request to a service device that implements the first service. As an example, the configuration request may indicate an endpoint of an application programming interface (API). The configuration request may be an HTTP request and/or a representational state transfer (REST) request. The configuration data may be stored in a database that can be accessed via the first service.

As shown by reference number 115, the management system may receive, via the first service, the configuration data. For example, the management system may receive the configuration data from the service device that implements the first service. The management system may receive the configuration data in an HTTP response and/or a REST response. The configuration data may indicate a heading (or title) for the content unit, a set of display parameters relating to one or more form fields of an electronic form, a set of validation parameters relating to the one or more form fields, and/or a mapping between the one or more form fields and a set of variables. For example, for each form field to be included in the electronic form, the configuration data may indicate a set of display parameters for the form field, a set of validation parameters for the form field, and/or a mapping between the form field and a variable of the set of variables. Thus, the configuration data may define a quantity of form fields that will be included in the electronic form, an order in which the form fields will be included in the electronic form, or the like. By using the configuration data in connection with the presentation template, as described herein, the quantity of form fields (e.g., user interface elements) is scalable to a virtually-limitless extent.

The configuration data may be particular to the content unit being requested (e.g., first configuration data may be used for a first content unit of the electronic document, second configuration data may be used for a second content unit of the electronic document, and so forth), but non-entity-specific (e.g., the configuration data for the content unit is the same across the plurality of entities). In some implementations, the configuration data may be particular to the presentation template. For example, for a first presentation template the configuration data may include a first set of display parameters and/or validation parameters, for a second presentation template the configuration data may include a second set of display parameters and/or validation parameters, and so forth.

The display parameters may provide a configuration of the attributes for each of the form fields (e.g., which can include input elements, buttons, or the like). For example, the display parameters may indicate, for each form field, a type of input element for the form field (e.g., a text input, a selection input, a checkbox input, a radio buttons input, a dropdown input, a multi-select dropdown input, a multi-select checkbox input, or the like), a format for the form field (e.g., a text or a numerical format), a label for the form field (e.g., text that is to appear next to the input element for the form field), and/or a name for the form field (e.g., that is used to differentiate the form field from other form fields), among other examples.

The validation parameters may provide a configuration of the validation properties and error handling for each of the form fields (e.g., each form field may have a respective set of validation parameters). For example, the validation parameters may indicate, for each form field, a respective validation condition, a respective error message for violation of the validation condition (e.g., an error message that is displayed in the electronic document if the validation condition is violated), and/or a respective event that is to trigger validation. The validation condition may indicate a maximum length for an input to the form field, a minimum length for the input, a format that is to be used for the input, one or more characters that must be present in the input, one or more characters that must not be present in the input, and/or whether the input is required for the form field, among other examples. The event to trigger validation of a form field may be a user click event (e.g., the user has clicked on an input element), a user input event (e.g., the user has provided input to an input element), a blur event (e.g., the user has left a form field), or the like (e.g., each form field may be validated at a different time depending on the event that is configured for the form field).

The set of variables may identify the pieces of information that are used in the form (e.g., the pieces of information that can be entered and/or updated via the electronic form). For example, if the electronic form includes a form field where a location of the entity can be entered and updated, then the set of variables may include a location variable. Accordingly, the mapping between the form fields and the set of variables may indicate that the input to a particular form field (e.g., the form field whether the location can be entered) corresponds to a particular variable (e.g., the location variable).

In some implementations, the configuration data may indicate a service (e.g., a microservice, a data service, or the like) that is to be used for the entity-specific data. For example, the service may be used to retrieve the entity-specific data, update the entity-specific data, or the like. The service may be particular to the content unit being requested (e.g., a first service may be used for entity-specific data for a first content unit of the electronic document, a second service may be used for entity-specific data for a second content unit of the electronic document, and so forth).

Figure 1C:
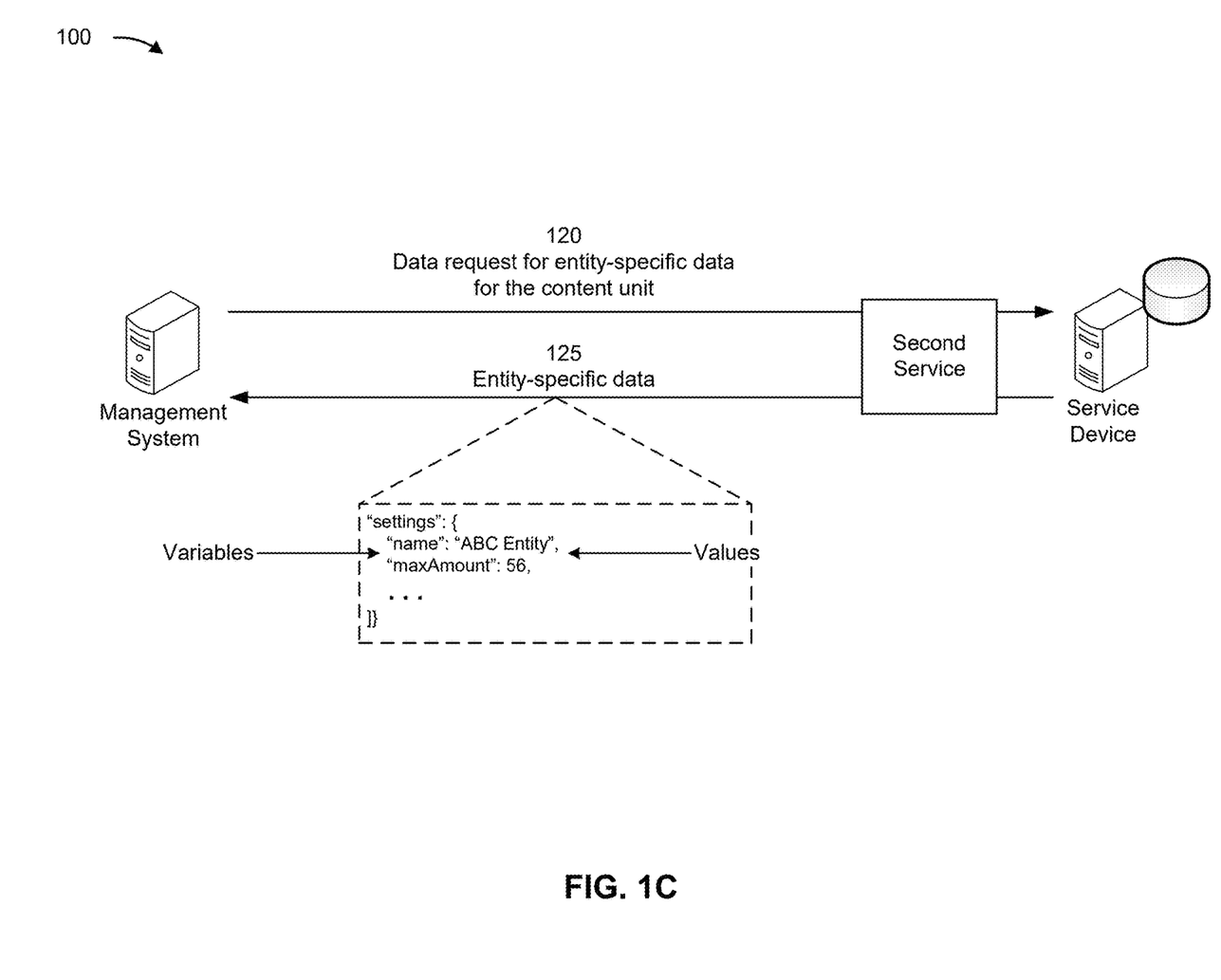

As shown in FIG. 1C, and by reference number 120, also in response to the request, the management system may transmit, via a second service (e.g., a second microservice, a second data service, or the like), a data request for the entity-specific data for the content unit. For example, the management system may transmit the data request to a service device that implements the second service (e.g., which may be the same device, or a different device, as the service device that implements the first service). As an example, the data request may indicate an endpoint of an API. The data request may be an HTTP request and/or a REST request. The entity-specific data may be stored in a database that can be accessed via the second service (e.g., which may be the same database, or a different database, as the database that stores the configuration data). In some implementations, the second service may be the service indicated in the configuration data.

As shown by reference number 125, the management system may receive, via the second service, the entity-specific data. For example, the management system may receive the entity-specific data from the service device that implements the second service. The management system may receive the entity-specific data in an HTTP response and/or a REST response. The entity-specific data may indicate values for the set of variables (e.g., values for respective variables of the set of variables). For example, the entity-specific data may indicate one or more values that were previously submitted by the entity (e.g., via the electronic form) and/or one or more default values (e.g., if the entity did not previously submit the values). Thus, the entity-specific data defines a current state of a group of settings for the entity. The entity-specific data may be particular to the content unit being requested (e.g., first entity-specific data may be used for a first content unit of the electronic document, second entity-specific data may be used for a second content unit of the electronic document, and so forth) and entity-specific (e.g., the entity-specific data for the content unit is different across the plurality of entities).

Figure 1D:
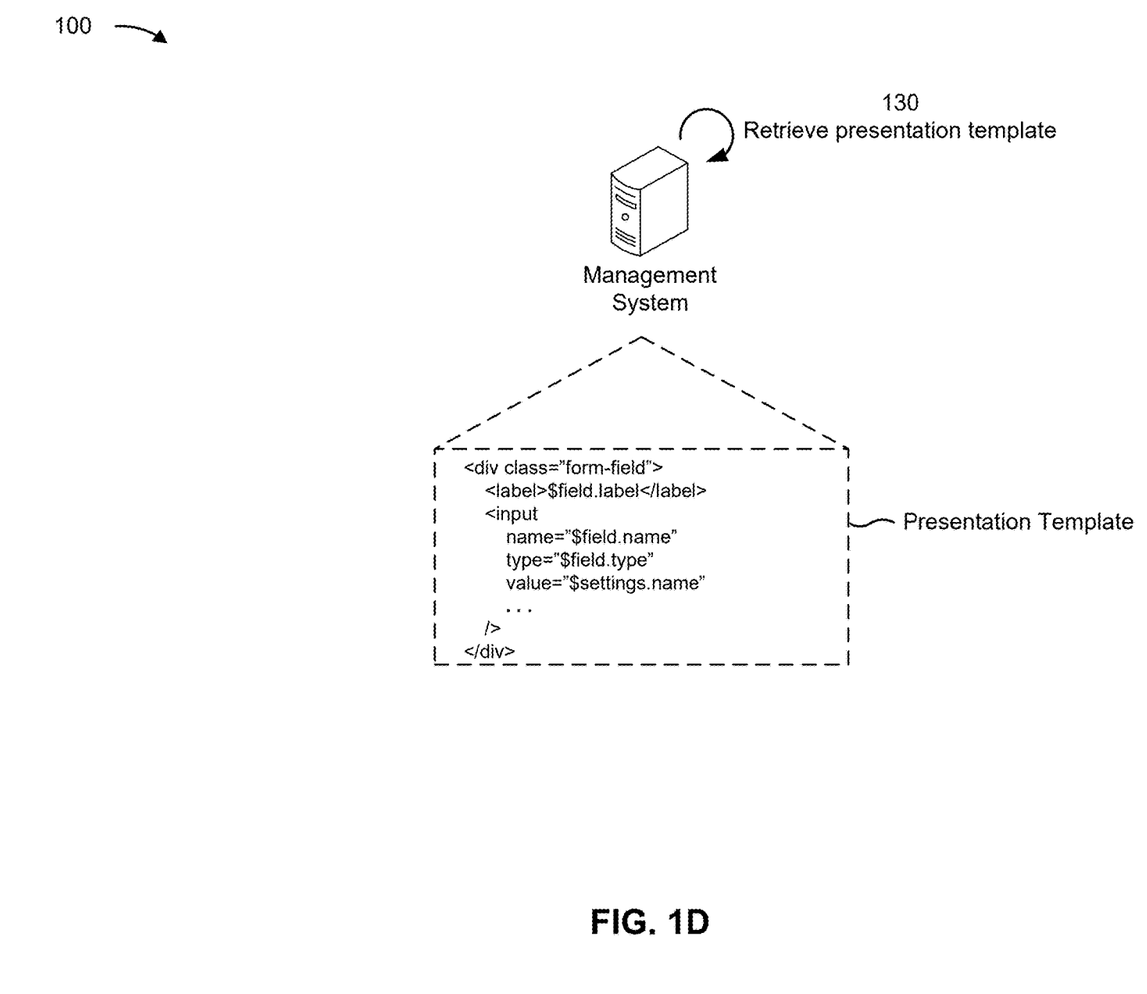

As shown in FIG. 1D, and by reference number 130, also in response to the request, the management system may retrieve the presentation template. The management system may retrieve the presentation template from a presentation template library, which may be implemented by the management system or by another device with which the management system communicates. The presentation template may provide a layout for the content unit, define an appearance for the content unit, and/or include additional markup for the content unit (e.g., defining a fixed user interface structure in which a content unit can be inserted). For example, the presentation template may include HTML markup. Each presentation template, of the presentation template library, may be shared among a plurality of content elements that are to have similar appearances and layouts. For example, a first presentation template may be used for any content unit that is to display one or more form fields in an array of rows and columns, a second presentation template may be used for any content unit that is to display a form field and to dynamically add content when a particular selection is made in the form field, and so forth. Thus, the presentation template retrieved by the management system may be used for the content unit and at least one additional content unit (e.g., that is to have a similar appearance and layout as the content unit). The presentation template may be non-entity-specific (e.g., the presentation template for the content unit is the same across the plurality of entities).

In some implementations, each content unit may have a read-only-mode presentation template and an editing-mode presentation template. The read-only-mode presentation template may be used to render the entity-specific data in a non-editable presentation format. The editing-mode presentation template may be used to render the entity-specific data, in the electronic form according to the configuration data, in an editable format. In some implementations, the content unit identified by the request may include multiple content sections (e.g., which the management system may identify by retrieving settings data for the content unit), and the content sections may have respective configuration data, entity-specific data, and presentation templates. Accordingly, the management system may transmit a respective configuration request and data request for each of the content sections, and the management system may aggregate the responses to the requests and the presentation templates for the content unit (e.g., into a single module of HTML).

Figure 1E:
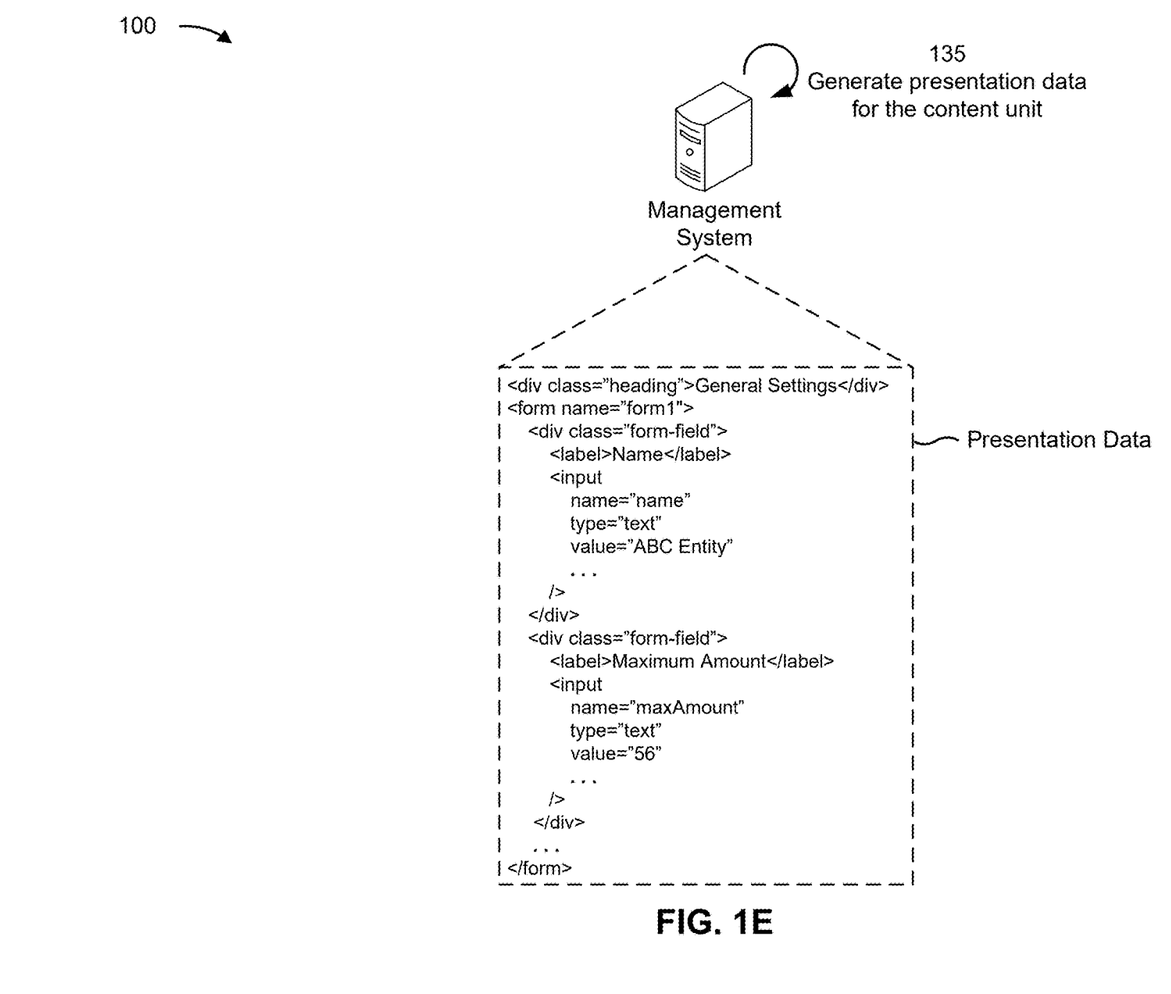

As shown in FIG. 1E, and by reference number 135, the management system may generate presentation data for the content unit. The presentation data may be based on (e.g., may include, or may include information derived from) the configuration data, the entity-specific data, and/or the presentation template. For example, the management system may generate the presentation data using the configuration data, the entity-specific data, and/or the presentation template. In some implementations, to generate the presentation data, the management system may generate the electronic form, using the presentation template and according to the set of display parameters of the configuration data, prefilled with the entity-specific data. For example, using the presentation template, the management system may generate each form field (e.g., that has a label and one or more input elements) indicated by the set of display parameters of the configuration data. Moreover, using the mapping between the form fields and the set of variables, the management system may generate input elements for the form fields prefilled with the entity-specific data.

In some implementations, the presentation data may include validation code (e.g., JavaScript code) associated with the electronic form. For example, the management system may generate the validation code using the set of validation parameters of the configuration data. The validation code may be configured to monitor user interactions with the electronic form, compare user inputs into input elements of the electronic form with validation conditions, and/or to cause error messages to be displayed in the electronic document when validation conditions are violated. The validation code is configured to provide client-side form validation, thereby conserving network resources and/or server resources that would otherwise be used to perform server-side form validation.

In some implementations, the presentation data may be a complete piece of content that is ready for insertion into the electric document without further manipulation by the user device. Alternatively, in some implementations, the presentation data may indicate the configuration data, the entity-specific data, and/or the presentation template in a format that can be used by the code of the electronic document. For example, the presentation data may enable the user device, using the code, to generate a complete piece of content that is ready for insertion into the electronic document.

Figure 1F:
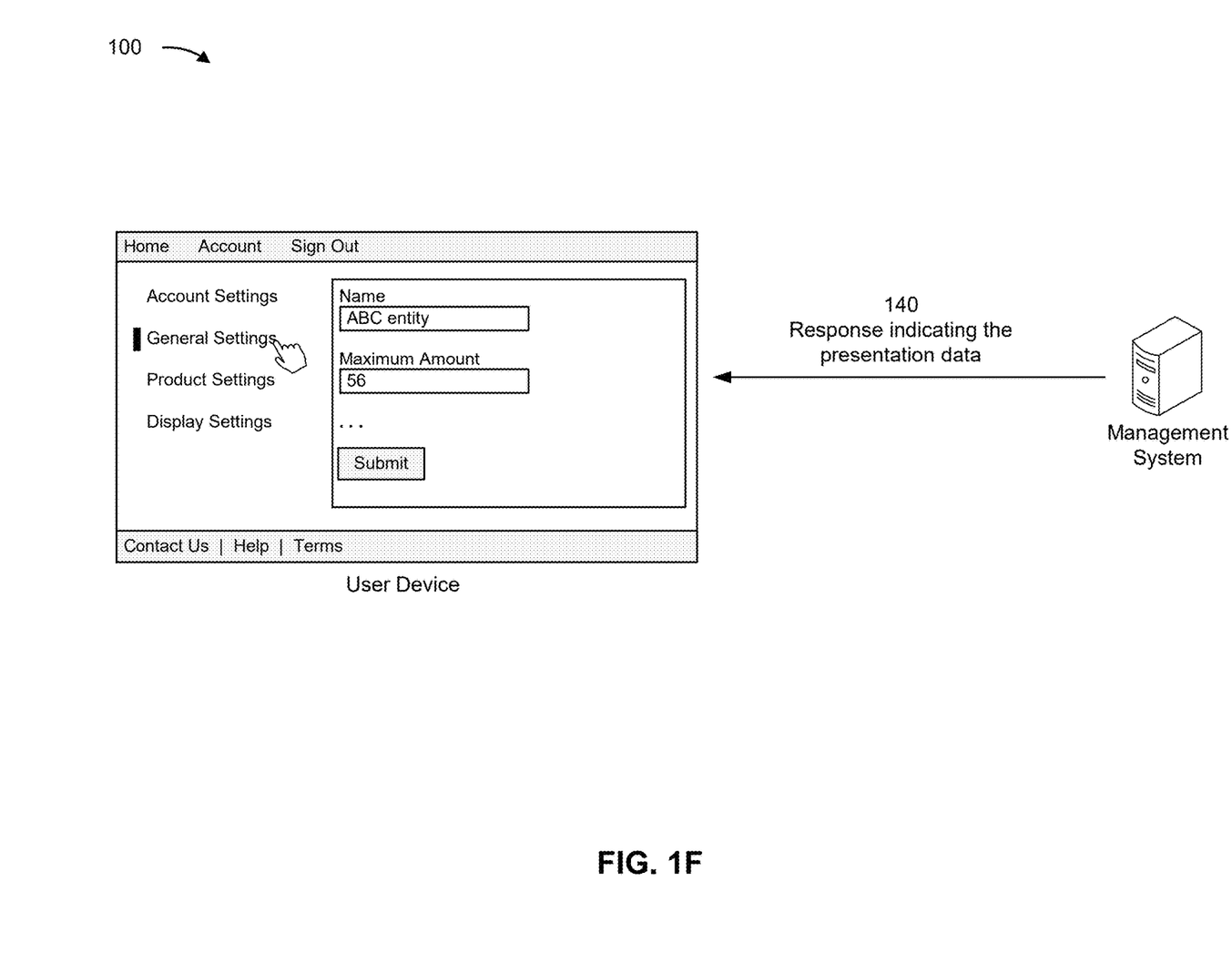

As shown in FIG. 1F, and by reference number 140, the management system may transmit, and the user device may receive, a response (to the user device's request) indicating the presentation data. The response indicating the presentation data may cause insertion of (e.g., by the user device, using the code) the content unit, in accordance with the presentation data, into the electronic document. For example, the response indicating the presentation data may cause insertion of the content unit, in accordance with the presentation data, into the DOM of the electronic document (e.g., to thereby render the electronic document). In some implementations, the content unit may include the presentation data as provided by the management system without modification. In some implementations, the response indicating the presentation data may cause generation (e.g., by the user device, using the code) of the content unit in accordance with the presentation data, and insertion (e.g., by the user device, using the code) of the generated content unit into the electronic document.

The response may be an HTTP response. In some implementations, the response is an asynchronous response to the asynchronous request caused by execution of the code in the electronic document. In some implementations, the management system may transmit the response for the user device via the intermediary device. For example, the response may be received at the web server executing the application, and the application may process the response and cause the web server to forward the response, in its original form or in a modified form, to the user device.

With the content unit inserted into the electronic document, a user of the user device may view and/or edit the entity-specific data. For example, the user may update the entity-specific data for one or more form fields, and may submit the electronic form. Editing of the electronic form, submission of the electronic form, and/or another validation-triggering event for the electronic form may cause validation of the electronic form (or one or more form fields thereof) in accordance with the validation code (e.g., the user device may execute the validation code to validate the electronic form). In this way, invalid data entered into the electronic form can be detected and blocked before such data is added to the database associated with the second service. In some implementations, the management system may receive, responsive to a submission of the electronic form, updated values entered in the form fields. The management system may generate an update request that correlates the updated values to the set of variables in accordance with the mapping between the form fields and the set of variables. The management system may transmit, via the second service, the update request. The update request may indicate that the values for the entity-specific data are to be updated to the updated values. Accordingly, responsive to the update request, the second service may cause the updated values to be added and/or updated in the database associated with the second service.

By using configurations and a shared, lightweight template to represent multiple content units, the information for the multiple content units can be stored more efficiently and using fewer computing resources than would otherwise be used by storing the same information as multiple static electronic documents.

As indicated above, FIGS. 1A-1F are provided as an example. Other examples may differ from what is described with regard to FIGS. 1A-1F.

Figure 2:
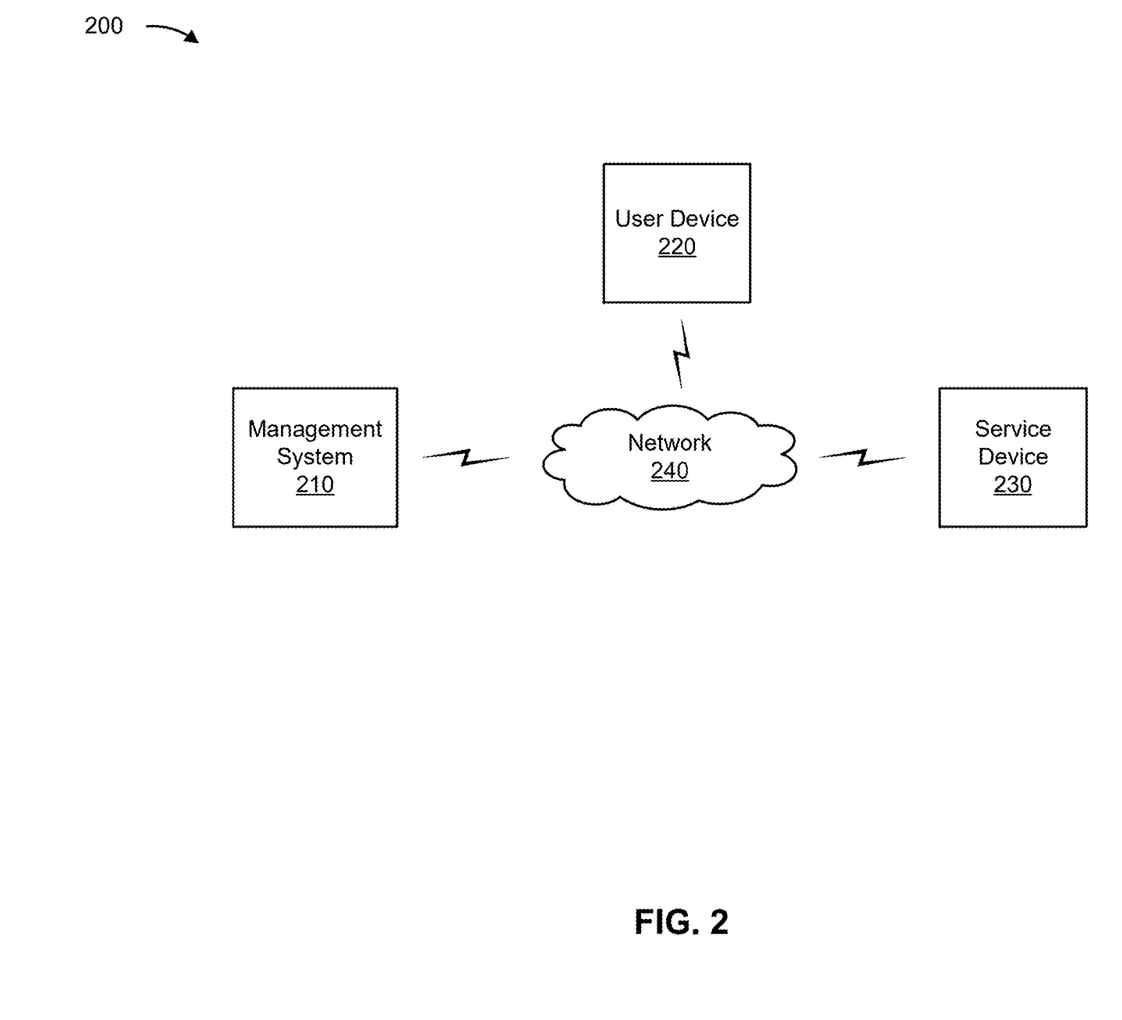
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a management system 210, a user device 220, a service device 230, and a network 240. Devices of environment 200 may interconnect via wired connections, wireless connections, or a combination of wired and wireless connections.

The management system 210 may include one or more devices capable of receiving, generating, storing, processing, providing, and/or routing information associated with loading content using configuration-based templates, as described elsewhere herein. The management system 210 may include a communication device and/or a computing device. For example, the management system 210 may include a server, such as an application server, a client server, a web server, a database server, a host server, a proxy server, a virtual server (e.g., executing on computing hardware), or a server in a cloud computing system. In some implementations, the management system 210 may include computing hardware used in a cloud computing environment.

The user device 220 may include one or more devices capable of receiving, generating, storing, processing, and/or providing information associated with loading content using configuration-based templates, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The service device 230 may include one or more devices capable of receiving, generating, storing, processing, providing, and/or routing information associated with loading content using configuration-based templates, as described elsewhere herein. The service device 230 may include a communication device and/or a computing device. For example, the service device 230 may include a server, such as an application server, a client server, a web server, a database server, a host server, a proxy server, a virtual server (e.g., executing on computing hardware), or a server in a cloud computing system. In some implementations, the service device 230 may include computing hardware used in a cloud computing environment.

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
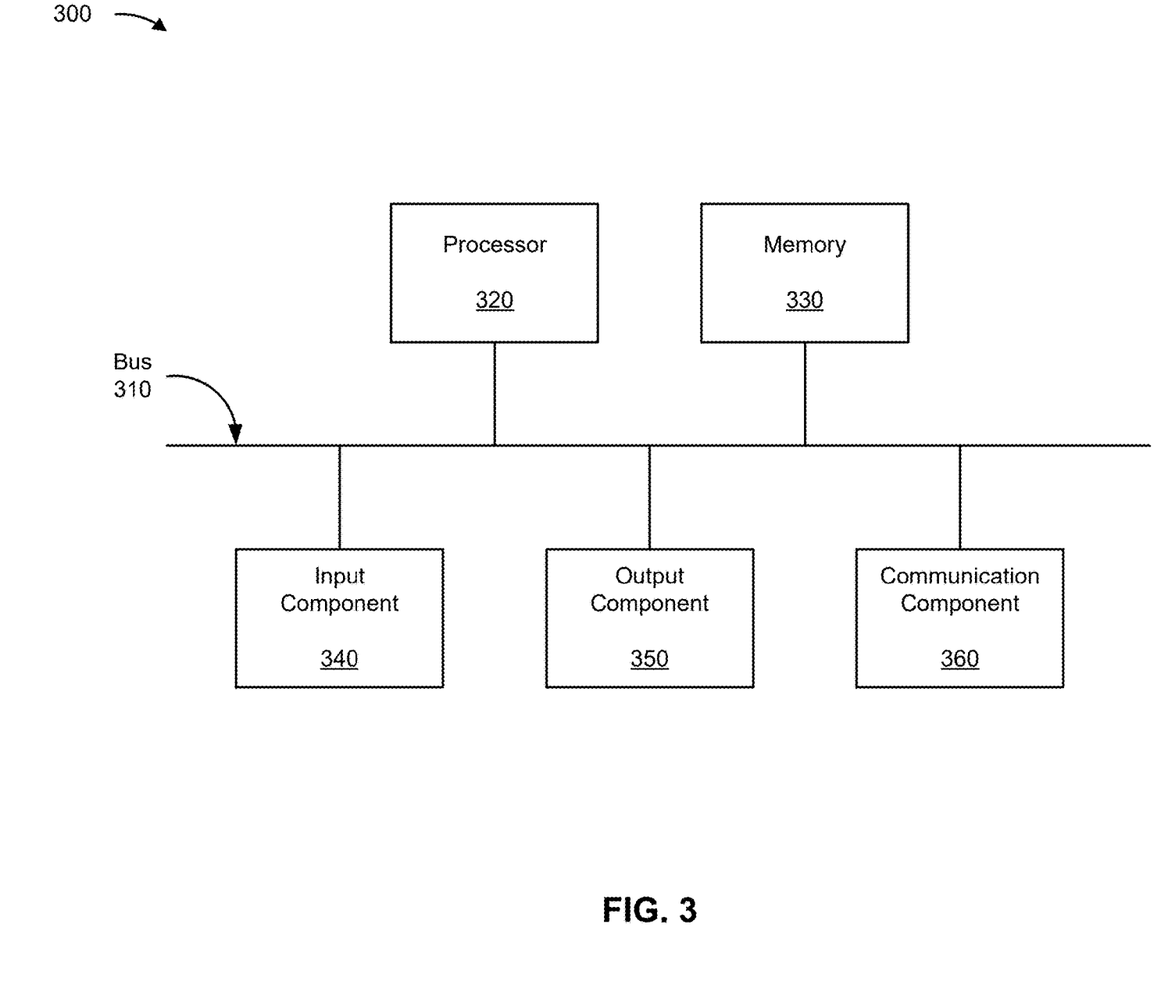
FIG. 3 is a diagram of example components of a device associated with loading content using configuration-based templates, in accordance with some embodiments of the present disclosure.

FIG. 3 is a diagram of example components of a device 300 associated with loading content using configuration-based templates. The device 300 may correspond to management system 210, user device 220, and/or service device 230. In some implementations, management system 210, user device 220, and/or service device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
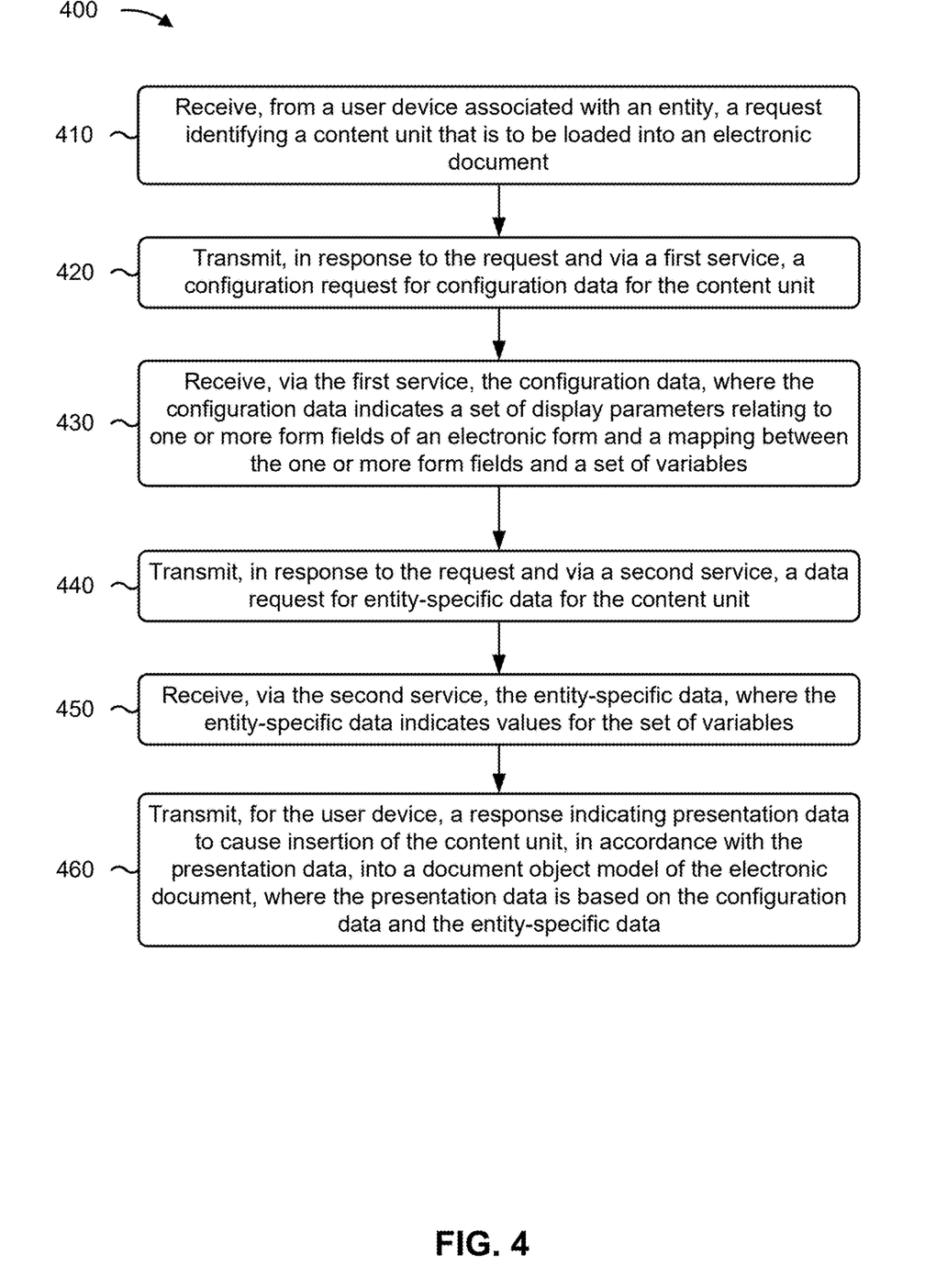
FIG. 4 is a flowchart of an example process associated with loading content using configuration-based templates, in accordance with some embodiments of the present disclosure.

FIG. 4 is a flowchart of an example process 400 associated with loading content using configuration-based templates. In some implementations, one or more process blocks of FIG. 4 may be performed by the management system 210. In some implementations, one or more process blocks of FIG. 4 may be performed by another device or a group of devices separate from or including the management system 210, such as the user device 220 and/or the service device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, from a user device associated with an entity, a request identifying a content unit that is to be loaded into an electronic document (block 410). For example, the management system 210 (e.g., using processor 320, memory 330, and/or communication component 360) may receive, from a user device associated with an entity, a request identifying a content unit that is to be loaded into an electronic document, as described above in connection with reference number 105 of FIG. 1A. As an example, the electronic document may be a top-level electronic document that is configured as a container to load any one of a plurality of content units, and the request may identify the content unit to be loaded.

As further shown in FIG. 4, process 400 may include transmitting, in response to the request and via a first service, a configuration request for configuration data for the content unit (block 420). For example, the management system 210 (e.g., using processor 320, memory 330, and/or communication component 360) may transmit, via a first service, a configuration request for configuration data for the content unit, as described above in connection with reference number 110 of FIG. 1B. As an example, the configuration data may be stored in a database that can be accessed via the first service.

As further shown in FIG. 4, process 400 may include receiving, via the first service, the configuration data, where the configuration data indicates a set of display parameters relating to one or more form fields of an electronic form and a mapping between the one or more form fields and a set of variables (block 430). For example, the management system 210 (e.g., using processor 320, memory 330, and/or communication component 360) may receive, via the first service, the configuration data, as described above in connection with reference number 115 of FIG. 1B. As an example, for each form field to be included in an electronic form, the configuration data may indicate a set of display parameters for the form field, a set of validation parameters for the form field, and/or a mapping between the form field and a variable of the set of variables.

As further shown in FIG. 4, process 400 may include transmitting, in response to the request and via a second service, a data request for entity-specific data for the content unit (block 440). For example, the management system 210 (e.g., using processor 320, memory 330, and/or communication component 360) may transmit, via a second service, a data request for entity-specific data for the content unit, as described above in connection with reference number 120 of FIG. 1C. As an example, the entity-specific data may be stored in a database that can be accessed via the second service.

As further shown in FIG. 4, process 400 may include receiving, via the second service, the entity-specific data, where the entity-specific data indicates values for the set of variables (block 450). For example, the management system 210 (e.g., using processor 320, memory 330, and/or communication component 360) may receive, via the second service, the entity-specific data, as described above in connection with reference number 125 of FIG. 1C. As an example, the entity-specific data may indicate one or more values that were previously submitted by the entity (e.g., via the electronic form) and/or one or more default values (e.g., if the entity did not previously submit the values).

As further shown in FIG. 4, process 400 may include transmitting, for the user device, a response indicating presentation data to cause insertion of the content unit, in accordance with the presentation data, into a document object model of the electronic document, where the presentation data is based on the configuration data and the entity-specific data (block 460). For example, the management system 210 (e.g., using processor 320, memory 330, and/or communication component 360) may transmit, for the user device, a response indicating presentation data to cause insertion of the content unit, in accordance with the presentation data, into a document object model of the electronic document, as described above in connection with reference number 140 of FIG. 1F. As an example, the response indicating the presentation data may cause insertion of the content unit, in accordance with the presentation data, into the DOM of the electronic document.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1F. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for loading content using configuration-based templates, the system comprising:
one or more memories; and
one or more processors, communicatively coupled to the one or more memories, configured to:
receive, from a user device associated with an entity, a request identifying a content unit that is to be loaded into a web page;
transmit, in response to the request and via a first service, a configuration request for configuration data for the content unit;
receive, via the first service, the configuration data, wherein the configuration data indicates a set of display parameters relating to one or more form fields of an electronic form, a set of validation parameters relating to the one or more form fields, and a mapping between the one or more form fields and a set of variables;
transmit, in response to the request and via a second service, a data request for entity-specific data for the content unit;
receive, via the second service, the entity-specific data, wherein the entity-specific data indicates values for the set of variables;
generate presentation data, for the content unit, using the configuration data, the entity-specific data, and a presentation template for the content unit; and
transmit, for the user device, a response indicating the presentation data to cause insertion of the presentation data into a document object model of the web page.

2. The system of claim 1, wherein the one or more processors, to generate the presentation data, are configured to:
generate validation code, for the electronic form, using the set of validation parameters,
wherein the presentation data includes the validation code.

3. The system of claim 1, wherein the one or more processors are further configured to:
receive, responsive to a submission of the electronic form, updated values entered for the one or more form fields; and
transmit, via the second service, an update request to update the values to the updated values,
wherein the update request correlates the updated values to the set of variables in accordance with the mapping.

4. The system of claim 1, wherein the second service is particular to the content unit, and
wherein the configuration data indicates that the second service is to be used for the data request.

5. The system of claim 1, wherein the display parameters indicate, for each form field of the one or more fields, one or more of:
a label for the form field, or
a type of input for the form field.

6. The system of claim 1, wherein the validation parameters indicate, for each form field of the one or more fields, one or more of:
a validation condition for the form field, or
an error message for violation of the validation condition.

7. The system of claim 1, wherein the validation parameters indicate respective events to trigger validation of the one or more form fields.

8. The system of claim 1, wherein the presentation template is used for the content unit and at least one additional content unit.

9. A method of loading content using configuration-based templates, comprising:
receiving, by a device and from a user device associated with an entity, a request identifying a content unit that is to be loaded into an electronic document;
transmitting, by the device in response to the request and via a first service, a configuration request for configuration data for the content unit;
receiving, by the device and via the first service, the configuration data,
wherein the configuration data indicates a set of display parameters relating to one or more form fields of an electronic form and a mapping between the one or more form fields and a set of variables;
transmitting, by the device in response to the request and via a second service, a data request for entity-specific data for the content unit;
receiving, by the device and via the second service, the entity-specific data,
wherein the entity-specific data indicates values for the set of variables; and
transmitting, by the device and for the user device, a response indicating presentation data to cause insertion of the content unit, in accordance with the presentation data, into a document object model of the electronic document,
wherein the presentation data is based on the configuration data and the entity-specific data.

10. The method of claim 9, wherein the presentation data is further based on a presentation template for the content unit.

11. The method of claim 10, wherein the presentation template is used for the content unit and at least one additional content unit.

12. The method of claim 9, wherein the presentation data aggregates the configuration data and the entity-specific data with a presentation template.

13. The method of claim 9, wherein the presentation data causes the user device to generate the content unit in accordance with the presentation data.

14. The method of claim 9, wherein the request and the response are asynchronous.

15. The method of claim 9, wherein the configuration data further indicates a set of validation parameters relating to the one or more form fields, and
wherein the method further comprises:
generating validation code, for the electronic form, using the set of validation parameters,
wherein the presentation data includes the validation code.

16. A non-transitory computer-readable medium storing a set of instructions for loading content using configuration-based templates, the set of instructions comprising:
one or more instructions that, when executed by one or more processors of a device, cause the device to:
receive, from a user device associated with an entity, a request identifying a content unit;
transmit, in response to the request, a configuration request for configuration data for the content unit;
receive the configuration data,
wherein the configuration data indicates a set of display parameters relating to one or more form fields of an electronic form and a mapping between the one or more form fields and a set of variables;
transmit, in response to the request, a data request for entity-specific data for the content unit;
receive the entity-specific data,
wherein the entity-specific data indicates values for the set of variables; and
transmit, for the user device, a response indicating presentation data, for the content unit, that is based on the configuration data, the entity-specific data, and a presentation template.

17. The non-transitory computer-readable medium of claim 16, wherein the content unit includes multiple content sections, and
wherein the one or more instructions further cause the device to transmit a respective configuration request and data request for each of the content sections.

18. The non-transitory computer-readable medium of claim 16, wherein the one or more instructions, when executed by the one or more processors, further cause the device to:
retrieve, in response to the request, the presentation template from a presentation template library.

19. The non-transitory computer-readable medium of claim 16, wherein the configuration data further indicates a set of validation parameters relating to the one or more form fields, and
wherein the one or more instructions, when executed by the one or more processors, further cause the device to:
generate validation code, for the electronic form, using the set of validation parameters, wherein the presentation data includes the validation code.

20. The non-transitory computer-readable medium of claim 16, wherein the presentation template is used for the content unit and at least one additional content unit.

\* \* \* \* \*